(12) United States Patent
Medure

(10) Patent No.: US 12,736,393 B2
(45) Date of Patent: Sep. 15, 2026

(54) VEHICLE WEIGHT MONITORING SYSTEM

(71) Applicant: Preston Medure, Gilbert, AZ (US)

(72) Inventor: Preston Medure, Gilbert, AZ (US)

( * ) Notice: Subject to any disclaimer, the term of this patent is extended or adjusted under 35 U.S.C. 154(b) by 566 days.

(21) Appl. No.: 17/947,040

(22) Filed: Sep. 16, 2022

(65) Prior Publication Data

US 2024/0094044 A1 Mar. 21, 2024

(51) Int. Cl.
*G01G 19/08* (2006.01)
*B60R 16/023* (2006.01)

(52) U.S. Cl.
CPC ......... *G01G 19/08* (2013.01); *B60R 16/0232* (2013.01)

(58) Field of Classification Search
CPC ............................ G01G 19/08; B60R 16/0232
USPC .......................................................... 177/136
See application file for complete search history.

(56) References Cited

U.S. PATENT DOCUMENTS 3,646,512 A 2/1972 Borgstede
4,231,450 A 11/1980 Hedtke et al.
8,160,806 B2 4/2012 Salaka
9,933,294 B1 4/2018 Salter et al.
11,062,582 B1 7/2021 Van Wiemeersch et al.
2010/0114437 A1* 5/2010 Boss ...................... B60K 28/08 701/48
2020/0247423 A1* 8/2020 Almahmoud .......... G01G 19/12

FOREIGN PATENT DOCUMENTS

EP 3597480 A1 * 1/2020 ............ B60P 1/6418
EP 3597480 B1 * 12/2022 ............ G01G 19/08
JP 2007155410 A 6/2007

* cited by examiner

*Primary Examiner* — Peter J Macchiarolo
*Assistant Examiner* — Mireille S Sadate-Moualeu
(74) *Attorney, Agent, or Firm* — Morgan Law Offices, PLC

(57) ABSTRACT

Weight sensors (scales) are configured to weigh cargo of a vehicle. The sensors can include transducers that convert input forces to electrical output signals. A vehicle control manager (which can be part of the vehicle computer system) receives the signals which represent measured weights. The vehicle control manager controls a display preferably on or near the dashboard that graphically shows, for example, the maximum weight for that truck, the current total weight in the bed, and where the weight is distributed in the bed. The information displayed can be indicated using a graphical illustration of a truck bed or the like.

15 Claims, 6 Drawing Sheets

VEHICLE WEIGHT MONITORING SYSTEM

TECHNICAL FIELD

The present disclosure relates generally to vehicle control systems, and more particularly to a vehicle weight monitoring system.

BACKGROUND

Serious problems can arise from overloading a vehicle or carrying an unbalanced load. When a vehicle is overloaded, braking distances increase, tires run hotter, and it can be more difficult to control the vehicle. Additionally, excessive weight puts strain on the vehicle's engine, suspension system, and transmission. Having an unbalanced load can be a safety problem even if the load weight does not exceed the manufacturer's recommendation. Whether the load is initially unbalanced or shifts during operation, an unbalanced vehicle can be more difficult to control and is more accident-prone.

Today, most drivers load up their vehicles not knowing the actual weight or whether the vehicle is overloaded. Drivers also often experience items shifting while the vehicle is moving but have no way of knowing.

SUMMARY

Weight sensors (scales) are configured to weigh cargo of a vehicle. The weight sensors can be attached underneath the cargo carrying portion of a vehicle, such as a truck bed. The sensors can include transducers that convert input forces to electrical output signals. A vehicle control manager (which can be part of the vehicle computer system) receives the signals which represent measured weights. The vehicle control manager controls a display preferably on or near the dashboard that graphically shows, for example, the maximum weight for the vehicle, the current total weight in the bed, and where the weight is distributed in the bed. The information displayed can be indicated using a graphical illustration of a truck bed or the like.

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout.

Figure 1:
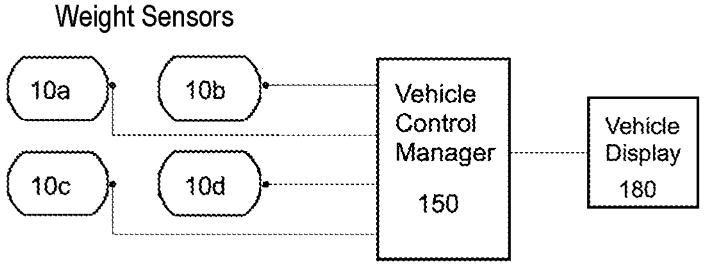
FIG. 1 shows a block diagram of a vehicle weight monitoring system, according to an example embodiment of the disclosure.

Referring to FIG. 1, a vehicle weight monitoring system 100, according to an example embodiment of the disclosure, is illustrated. As shown, the weight monitoring system 100 includes a plurality of weight sensors 10*a*-10*d*, a vehicle control manager 150, and a vehicle display 180. The weight sensors 10*a*-10*d* are scales attached underneath a cargo carrying structure such as a truck bed. The weight sensors 10*a*-10*d* may be attached to a suitable structural element of the vehicle, such as the frame, preferably underneath the bed lining. The vehicle control manager 150 can be a computer system that controls various other aspects of the vehicle. It can, but need not be, a central computer system. Alternatively, the vehicle control manager 150 can have limited functionality. The weight sensors 10*a*-10*d* can transmit weight information to the vehicle control manager 150. The information can be transmitted using a wired or wireless connection.

Figure 2:
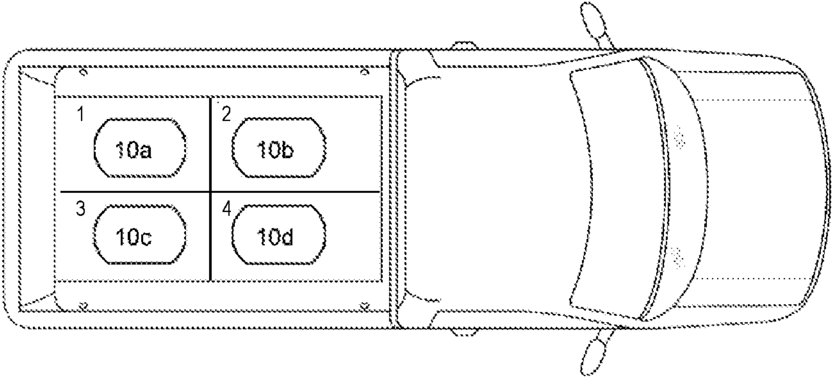
FIG. 2 shows locations of weight sensors in a truck bed, according to an example embodiment of the disclosure.

Referring to FIG. 2, example locations of the weight sensors 10*a*-10*d* in an example truck bed, according to an embodiment of the disclosure, are illustrated. Although the illustrated truck bed corresponds to a typical "half ton" pickup truck, it is to be appreciated that the present disclosure is not limited to the type of vehicle shown. That is, the truck bed could be longer or shorter than shown. Additionally, the vehicle need not be a pick-up truck. Alternatively, the vehicle could be an SUV, a commercial truck, or even an RV (recreational vehicle), for example. It is to be appreciated, therefore, that the number of weight sensors 10*a*-10*d* shown could be lesser or greater than shown.

In FIG. 2, each of the weight sensors 10*a*-10*d* is disposed within a separate cell. The cells are numbered from 1-4 herein for convenience and each can take up about the same area. As shown, weight sensor 10*a* is contained in cell 1; weight sensor 10*b* is contained in cell 2; weight sensor 10*c* is contained in cell 3; and weight sensor 10*d* is contained in cell 4. Each of the weight sensors 10*a*-10*d* can include a weighing platform. The weighing platforms can be placed immediately below the truck bed liner. The purpose of a weighing platform is to direct the downward forces from objects within the cell. Thus, it is possible to measure loads within individual sections (cells) of a truck bed or the like. Advantageously, this information can be used to ascertain and display the real-time load distribution.

Figure 3:
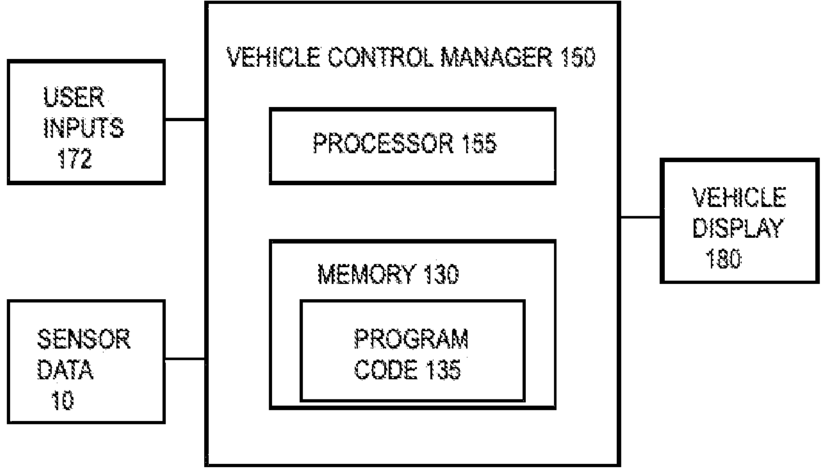
FIG. 3 shows a more detailed block diagram of the vehicle weight monitoring system, according to an example embodiment of the disclosure.

Referring to FIG. 3, a block diagram of the vehicle weight monitoring system 100, according to an example embodiment, is illustrated. As mentioned, the vehicle weight monitoring system 100 includes the vehicle control manager 150. The vehicle control manager 150 includes a processor 155 and memory 130 (including a stored set of instructions embedded thereon, herein referred to as program code 135). The processor 155 can be a programmable logic processor (PLC) or the like. Program code 158 can include a set of instructions to control the operation of the PLC. Alternatively, the processor 155 can be a general-purpose computer or another type of computing device, or even a hardwired circuit. The inputs into the processor 155 include user inputs 172 and sensor data 10. The user inputs 172 can be employed by a user to operate the vehicle weight monitoring system 100. For instance, the user inputs 172 can be obtained responsive to a user requesting certain monitoring parameters, e.g., the current total vehicle weight, the load distribution, and even a history of such items over time.

In the present description of the present invention, example methods for performing various aspects of the present invention are disclosed. It is to be understood that the steps illustrated herein can be performed by executing computer program code written in a variety of suitable programming languages, such as C, C++, C #, Visual Basic, and Java.

In the description of the control manager 150 disclosed herein, the focus is on employing the control manager 150 for monitoring load weight and distribution. However, it is to be understood that the control manager 150 could additionally be used to control a variety of other automotive functions, such as turning the engine on remotely and monitoring the various subsystems of the vehicle such as the engine, transmission, battery, heating and A/C system, power windows, power locks, entertainment system, etc. It is to be understood that the examples described herein are presented for clarity and simplicity of exposition and are not meant to be limiting. Furthermore, it is to be understood that some or all of the functionality of the vehicle control manager 150 could be incorporated into an existing computer system of an automotive vehicle.

As shown, the control manager 150 is operatively connected to the vehicle display 180. The vehicle display 180 can be a separate display preferably located near the driver's side of the dashboard. Alternatively, the vehicle display could be incorporated into an existing display system. It could also be a heads-up display (HUD).

Figure 4:
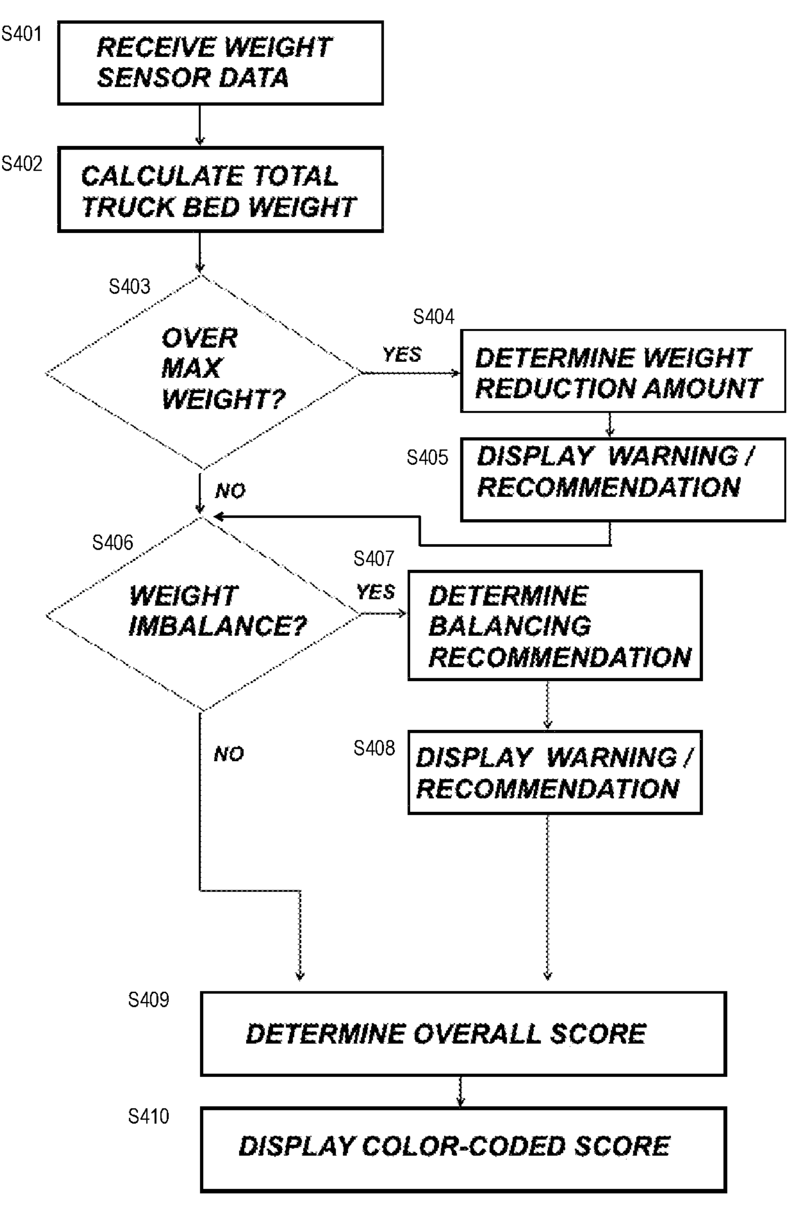
FIG. 4 shows a process for monitoring vehicle weight, according to an example embodiment of the disclosure.

Referring to FIG. 4, a process for monitoring vehicle weight, according to an embodiment of the disclosure, is illustrated. It is to be understood that the illustrated process described herein is provided for explanatory purposes and is not meant to be limiting. The illustrated process starts at step S401 ("Receive Weight Sensor Data"), where weight sensor data is provided to the vehicle control manager 150 via the weight sensors 10*a*-10*d* disposed in the cells 1-4. Next, in step S402 ("Calculate Total Truck Bed Weight"), the vehicle control manager sums the input weights received from the weight sensors 10*a*-10*d* to arrive at the total truck bed weight. In step S403 ("Over Max Weight?"), a determination is made as to whether the total truck bed weight exceeds a maximum weight (which can be provided by the manufacturer of the vehicle, based on the year, make and model as equipped, for example).

If it is determined that the total truck bed weight exceeds the maximum weight, in step S404 ("Determine Weight Reduction Amount"), the amount of weight needed to be reduced to no longer exceed the maximum weight is calculated by subtracting the maximum weight from the total truck bed weight. In step S405 ("Display Warning/Recommendation"), an appropriate warning regarding the overweight situation which may include the weight reduction amount is output to the display 180. The warning can be one or more of a visual warning, an audible warning, and a haptic warning.

Regardless of whether the maximum weight amount is exceeded, next, at step S406 ("Weight Imbalance?"), a further determination is made as to whether there is a vehicle weight imbalance. A weight imbalance can occur when weight measured from one or more of the weight sensors 10*a*-10*d* indicates excess weight relative to a portion of the vehicle. For example, cells 3 and 4 (on the right side of the vehicle) may exceed the maximum allowable weight for the right side of the vehicle. In general, the system can be configured to specify a set of rules to determine situations where the load is unbalanced that can take into consideration the maximum allowable weight of combinations of one or more of the cells 1-4. This can include imbalances occurring toward a side of the vehicle (right side or left side), the back or front of the vehicle, and even in a particular cell.

If it is determined that there is a weight imbalance, in step S407 ("Determine Balancing Recommendation"), a recommendation to remedy the imbalance situation is determined. In step S408 ("Display Warning/Recommendation"), a warning as to the imbalance and the recommendation can be displayed on the display 180. The recommendation could be that a certain amount of weight should be reduced in specific cells. This might be accomplished by the user shifting the weight to another part of the truck bed, for example. Notably, when the truck bed is re-arranged, the system once again repeats the forgoing process to determine whether the vehicle is still unbalanced. Advantageously, this information is displayed in real-time for the user to take appropriate action.

In step S409 ("Determine Overall Score"), the vehicle control manager 150 determines an overall score taking into consideration the vehicle weight relative to the maximum weight and the extent, if any, of an imbalance. A color-coded value can be displayed on the display 80 (in S410 ("Display Color Coded Score")) corresponding to the score. For example, a green color could be given for "Good", yellow for "Mild", blue for "Medium", and red for "Max."

Figure 5A:
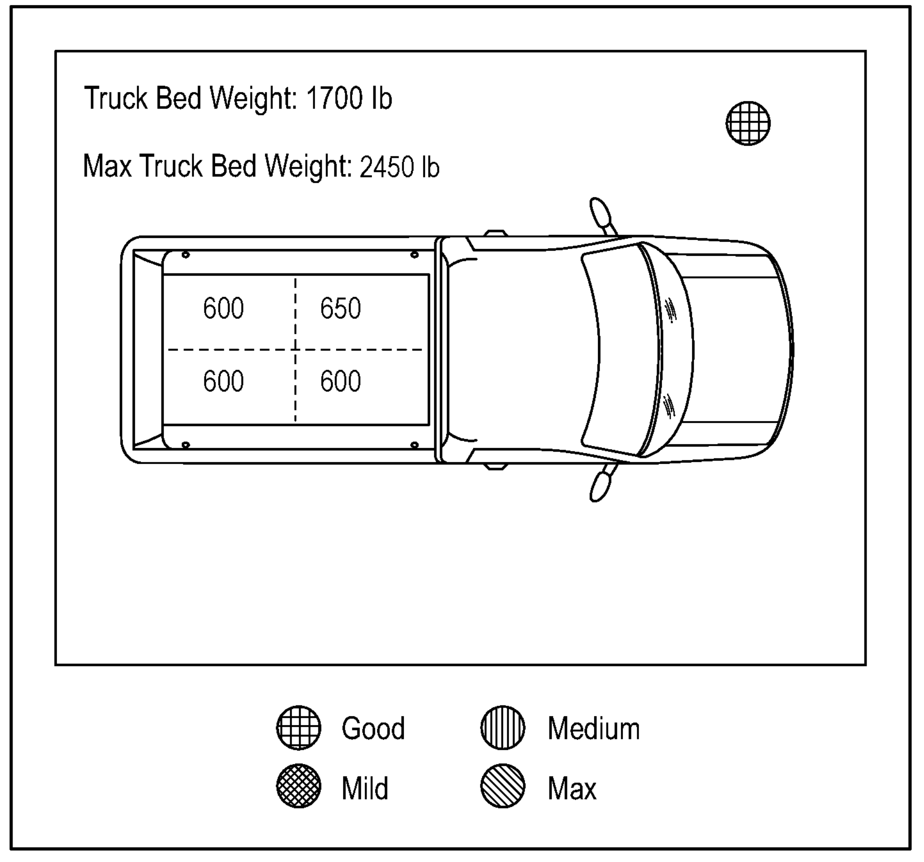
FIGS. 5A-5C show example display screens useable for displaying vehicle weight and balance information, according to an example embodiment of the disclosure.
Figure 5B:
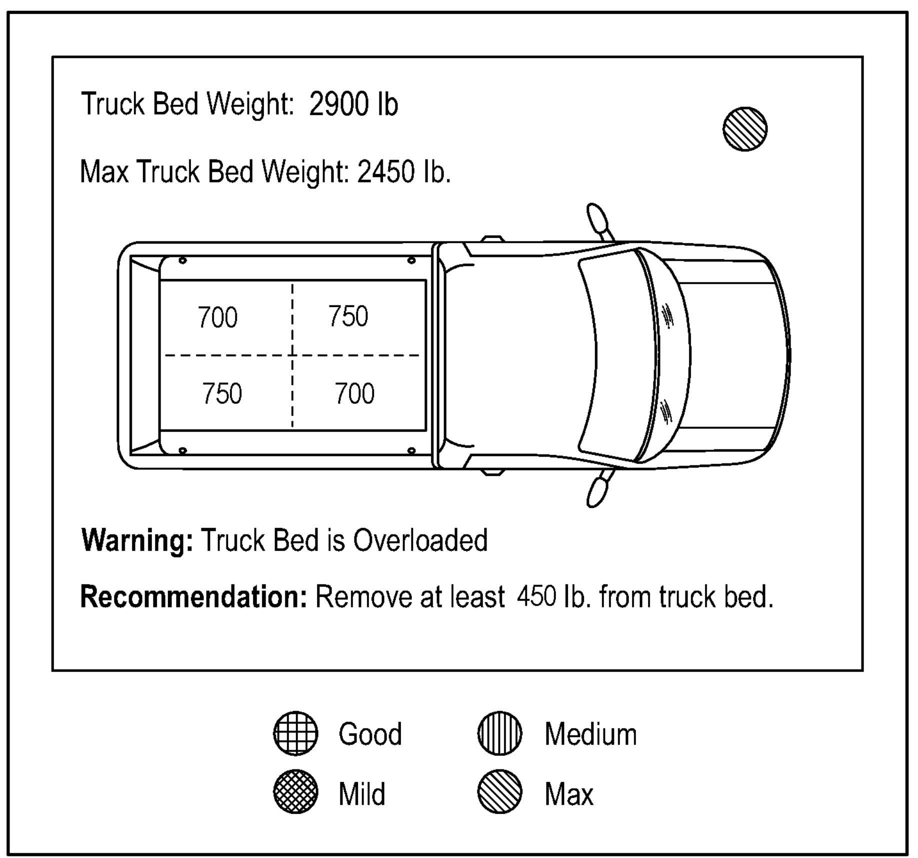
Figure 5C:
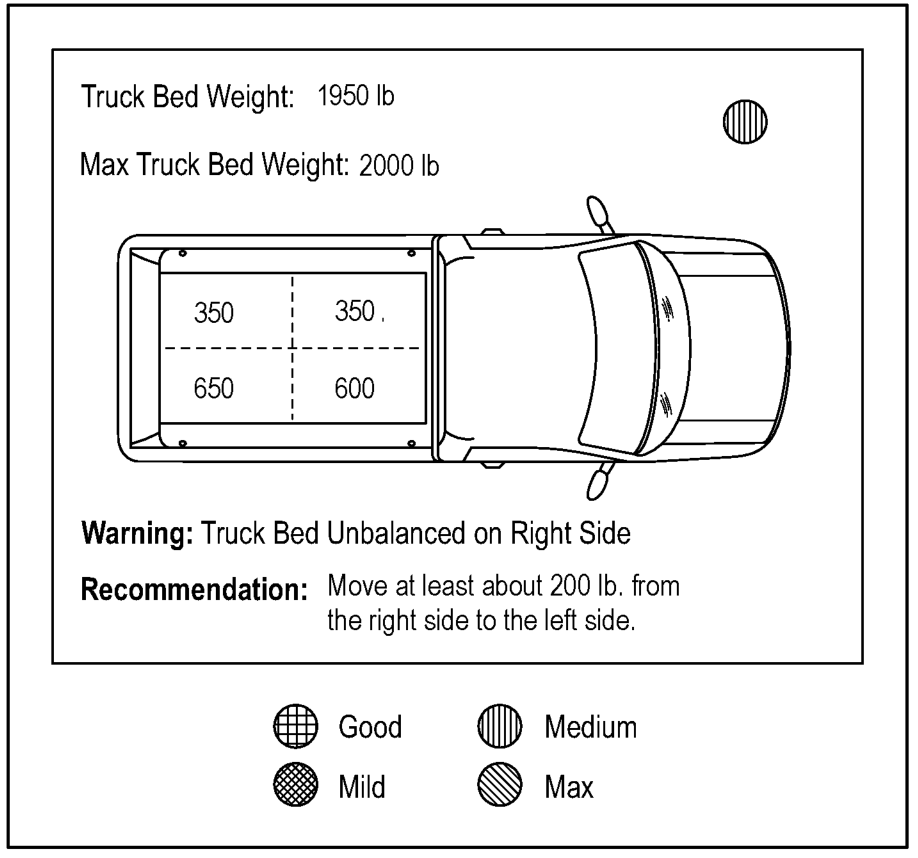

Referring to FIGS. 5A-5C, various example screens showing vehicle weight and balance information are illustrated. These screens can be displayed on the vehicle display 180. It is to be understood that these display screens are presented herein for illustrative purposes and are meant to convey only a few of the possible situations that may arise.

FIG. 5A is an example screen illustrating a situation in which the vehicle has a truck bed weight of 1700 lb. The maximum weight for this vehicle is 2450 lb. The weights are distributed as follows: 600 lb. in cell 1, 650 lb. in cell 2, 600 lb. in cell 3, and 600 lb. in cell 4. The vehicle is not close to being overloaded or imbalanced. The score is "Good" and color-coded in green.

FIG. 5B is an example screen illustrating a situation in which the vehicle has a truck bed weight of 2900 lb. The maximum weight for this vehicle is 2450 lb. The weights are distributed as follows: 700 lb. in cell 1, 750 lb. in cell 2, 750 lb. in cell 3, and 700 lb. in cell 4. The vehicle is overloaded. The recommendation is to remove at least 450 lb. from the vehicle. The score is "Max" and color-coded in red.

FIG. 5C is an example screen illustrating a situation in which the vehicle has a truck bed weight of 1950 lb. The maximum weight for this vehicle is 2000 lb. The weights are distributed as follows: 350 lb. in cell 1, 350 lb. in cell 2, 650 lb. in cell 3, and 600 lb. in cell 4. The vehicle is not overloaded but is unbalanced. The recommendation is to remove at least 200 lb. from the right side of the vehicle so that the load is more safely distributed. The score is "Medium" and color-coded as blue.

Conditional language, such as, among others, "can," "could," "might," or "may," unless specifically stated otherwise, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A vehicle weight monitoring system, comprising installed underneath a lining divided into cells of a vehicle, a plurality of weight sensors that each individually measure weight of cargo of the vehicle that is situated above the lining for a respective one of the cells;

a control manager operationally connected to the weight sensors; and a display operationally connected to the control manager;

wherein the control manager in real-time during driving of the vehicle determines weight information using input from the weight sensors and causes the display to graphically display the weight information;

wherein the outputted weight information displayed on the display includes:

for each of the cells, a numeric amount, in a predetermined weight unit, of the measured weight of the cargo as measured by the respective one of the weight sensors;

a warning if it is determined that a load in the bed is over a maximum weight along with a specific recommendation as to an amount of weight to remove so that the load is no longer over the maximum weight;

a warning if it is determined that a load in the bed is imbalanced along with a recommendation as to how to correct the imbalance including a specific recommendation as to a weight amount to move from a first side to a second side; and wherein the control manager determines load weight relative to the maximum weight, determines an extent of imbalance based on a distribution of weights among the cells, calculates an overall score based on both the determined load weight relative to the maximum weight and the determined extent of imbalance, and causes the display to output a color-coded value corresponding to the overall score.

2. The vehicle weight monitoring system of claim 1, wherein the vehicle is a truck.

3. The vehicle weight monitoring system of claim 2, wherein each of the cells is located within a different area of the truck bed.

4. The vehicle weight monitoring system of claim 3, wherein the control manager determines whether a load of the vehicle is unbalanced based on a set of rules taking into consideration the distribution of weights among the cells.

5. The vehicle weight monitoring system of claim 1, wherein the display shows a graphical depiction of a truck bed.

6. The vehicle weight monitoring system of claim 1, wherein the vehicle is an SUV.

7. The vehicle weight monitoring system of claim 1, wherein the control manager sums the weights from each of the weight sensors to calculate a total vehicle weight and the display graphically illustrates the total vehicle weight.

8. The vehicle weight monitoring system of claim 1, wherein the vehicle control manager causes the display to output the total recommended maximum load weight and displays the total calculated load weight.

9. The vehicle weight monitoring system of claim 1, wherein the vehicle control manager causes the display to color-code the warnings.

10. The vehicle weight monitoring system of claim 1, wherein the vehicle control manager causes the display to audibly output one or more of the warnings.

11. The vehicle weight monitoring system of claim 1, wherein the vehicle control manager causes the display to haptically output one or more of the warnings.

12. The vehicle weight monitoring system of claim 1, wherein the lining is a bed lining.

13. The vehicle weight monitoring system of claim 1, wherein the color-coded value comprises one of at least three different color-coded values corresponding to different levels of the overall score.

14. The vehicle weight monitoring system of claim 13, wherein the color-coded value comprises one of at least four different color-coded values corresponding to different levels of the overall score.

15. The vehicle weight monitoring system of claim 14, wherein the at least four different color-coded values comprise a green value corresponding to Good, a yellow value corresponding to Mild, a blue value corresponding to Medium, and a red value corresponding to Max.

* * * * *